(12) United States Patent
Wiednig et al.

(10) Patent No.: US 8,381,980 B2
(45) Date of Patent: Feb. 26, 2013

(54) EVALUATING AN ELECTROMAGNETIC FIELD STRENGTH OF AN ELECTROMAGNETIC GATE APPARATUS

(75) Inventors: Gerald Wiednig, Stainz (AT); Michael Buchmann, Gosau (AT); Ronny Schomacker, Graz (AT)

(73) Assignee: NXP B.V., Eindhoven (NL)

( * ) Notice: Subject to any disclaimer, the term of this patent is extended or adjusted under 35 U.S.C. 154(b) by 213 days.

(21) Appl. No.: 12/811,962

(22) PCT Filed: Jan. 8, 2009

(86) PCT No.: PCT/IB2009/050067
§ 371 (c)(1),
(2), (4) Date: Jul. 7, 2010

(87) PCT Pub. No.: WO2009/087599
PCT Pub. Date: Jul. 16, 2009

(65) Prior Publication Data
US 2010/0282848 A1    Nov. 11, 2010

(30) Foreign Application Priority Data

Jan. 9, 2008 (EP) .................................... 08100250

(51) Int. Cl.
*G06K 19/06* (2006.01)

(52) U.S. Cl. ........................................ 235/438; 235/492

(58) Field of Classification Search ................... 235/438, 235/492, 486, 487, 493, 375, 380, 383, 384, 235/385
See application file for complete search history.

(56) References Cited

U.S. PATENT DOCUMENTS

| 2002/0041233 | A1 | 4/2002 | Nicholson |
| 2005/0108164 | A1* | 5/2005 | Salafia et al. ............. 705/42 |
| 2007/0290802 | A1* | 12/2007 | Batra et al. ............. 340/10.1 |

FOREIGN PATENT DOCUMENTS

| EP | 1 233 273 A | | 8/2008 |
| WO | WO 2007/102784 | * | 9/2007 |

* cited by examiner

Primary Examiner — Thien M Le

(57) ABSTRACT

A device (110) for evaluating an electromagnetic field strength/field geometry of an electromagnetic gate apparatus (120) is provided, the device (110) comprising a measurement unit (112) adapted for receiving a measurement signal from the electromagnetic gate apparatus (120) and determining a value of the field strength of said measurement signal, a communication unit (114) adapted for receiving command data from the electromagnetic gate apparatus (120) and adapted for sending response datato the electromagnetic gate apparatus (120). Optionally, the device (110) comprises an evaluation unit (116,118) adapted for evaluating the electromagnetic field geometry of the electromagnetic gate apparatus (120) based on said values of the field strength received from the measurement unit (112).

10 Claims, 1 Drawing Sheet

EVALUATING AN ELECTROMAGNETIC FIELD STRENGTH OF AN ELECTROMAGNETIC GATE APPARATUS

FIELD OF THE INVENTION

The invention relates to a device for evaluating an electromagnetic field strength of an electromagnetic gate apparatus. Moreover, the invention relates to a method of evaluating an electromagnetic field strength of an electromagnetic gate apparatus.

BACKGROUND OF THE INVENTION

The importance of automatic identification systems increases particularly in the service sector, in the field of logistics, in the field of commerce and in the field of industrial production. Further applications of identification systems are related to the identification of persons and animals.

In particular contactless identification systems like transponder systems (for instance using an RFID tag) are suitable for a wireless transmission of data in a fast manner and without cable connections that may be disturbing. Such systems use the emission and absorption of electromagnetic waves, particularly in the high frequency domain.

A shortcoming of the RFID technology is that when one or multiple RFID tags are read by a reader device (which may also be denoted as an electromagnetic gate apparatus), the reading rate may depend on the position of the individual RFID tags in relation to the reader device, due to a location dependent or spatially dependent field distribution within an operating range of an electromagnetic gate apparatus. In order to analyze this characteristic, it may desirable to have accurate information regarding the electromagnetic field strength or field geometry of an electromagnetic gate apparatus.

OBJECT AND SUMMARY OF THE INVENTION

It is an object of the invention to evaluate electromagnetic field strength of an electromagnetic gate apparatus with low effort and high precision.

In order to achieve the object defined above, a device for evaluating an electromagnetic field strength of an electromagnetic gate apparatus and a method of evaluating an electromagnetic field strength of an electromagnetic gate apparatus according to the independent claims are provided.

According to an exemplary embodiment of the invention, a device for evaluating (for instance quantifying, determining a spatial dependency of, rating regarding operability of a transponder at specific positions) an electromagnetic field strength (for instance an electric and/or magnetic field distribution depending on position and/or time) of an electromagnetic gate apparatus (for instance an apparatus for reading information from and/or writing information into a transponder) is provided, the device comprising a measurement unit adapted for (for instance exclusively, i.e. not providing further services apart from receiving) receiving a measurement signal (such as an unmodulated carrier wave or a modulated signal) from the electromagnetic gate apparatus (which may be functionally coupled to the device) and determining a value of the field strength of said measurement signal, a communication unit adapted for receiving command data (such as capturing electromagnetic signals including commands from the electromagnetic gate apparatus regarding the measurement) from the electromagnetic gate apparatus and adapted for sending response data (such as emitting electromagnetic signals in response to the receipt of command data) to the electromagnetic gate apparatus.

In a preferred embodiment, the inventive device comprises an evaluation unit (such as a processor, for instance a microprocessor or a central processing unit, CPU) adapted for evaluating the electromagnetic field geometry of the electromagnetic gate apparatus based on the on said values of the field strength determined by the measurement unit. To obtain the field geometry, i.e. a particular field strength at a particular location, means for determining the location/position and/or orientation of said device are provided. Methods of determining the location/position and orientation are known per se and not mentioned in detail here. For example, the location can be determined by triangulation of electromagnetic signals or by the coordinates provided by a robot, which moves the inventive device automatically within the radio range of the electromagnetic gate apparatus. Such a robot can be implemented as a so-called "pallet movement system", which moves a pallet with sample products and with the inventive field strength recorder within the radio range of the electromagnetic gate apparatus. If, for example, the pallet is moved with constant velocity from a distinct starting point, then the position of the inventive device can easily be derived.

In a simple implementation the evaluation unit records values of the field strength at predetermined time intervals. These data combined with the data of the pallet movement system is then used for evaluating the field geometry. To be strict, the final evaluation step is taken outside of the inventive field strength recorder.

In a further implementation, the evaluation unit is supplied with timing information (e.g. a clock signal of a known frequency which is available in the inventive device) the evaluation unit can store a time stamp for each recorded value of field strength. Again, these data combined with the data of the pallet movement system is used for evaluating the field geometry. And again, the final evaluation step is taken outside of the inventive field strength recorder.

In a further implementation, the evaluation unit receives information about the speed of the pallet. With timing information (which can be obtained as explained hereinbefore) the evaluation unit can calculate the position and store both the value of the field strength and the position. Here, the evaluation of the field geometry is done fully inside the inventive field strength recorder.

To synchronize the pallet movement system and the inventive field strength recorder, the evaluation unit may additionally receive a signal, when the movement of the pallet is started.

According to another exemplary embodiment of the invention, a communication system is provided comprising an electromagnetic gate apparatus adapted for generating an electromagnetic field having an electromagnetic field geometry, and a device having the above mentioned features for evaluating the electromagnetic field strength/field geometry of the electromagnetic gate apparatus.

According to still another exemplary embodiment of the invention, a method of evaluating an electromagnetic field strength of an electromagnetic gate apparatus is provided, the method comprising the steps of a measurement unit receiving a measurement signal from the electromagnetic gate apparatus, a communication unit receiving command data from the electromagnetic gate apparatus and sending response data to the electromagnetic gate apparatus (for instance upon receipt of command data, thereby replying to the corresponding command).

Data processing which may be performed according to embodiments of the invention can be realized by a computer program, that is by software, or by using one or more special electronic optimization circuits, that is in hardware, or in hybrid form, that is by means of software components and hardware components.

The term "electromagnetic gate apparatus" may particularly denote a read device, a write device, or a combined read and write device for reading information from a further communication device and/or for programming information into the further communication device (for instance a transponder such as an RFID tag, a further read/write device, etc.), during normal use. According to an exemplary embodiment of the invention, such an electromagnetic gate apparatus may however be a device under test, so that the electromagnetic field distribution, characteristic or configuration of the electromagnetic gate apparatus is evaluated. According to an exemplary embodiment of the invention, the electromagnetic gate apparatus may be an UHF gate application apparatus.

The term "transponder" may particularly denote an RFID tag or a smartcard. More generally, a transponder may be a device (for instance comprising a chip) which may automatically transmit certain (for example coded data) when activated by a special signal from an interrogator.

According to an exemplary embodiment of the invention, an electric and/or magnetic field amplitude recorder may be provided having particularly two separate units which may communicate via separate channels. One of these units may be a measurement unit which merely receives measurement signals originating from an electromagnetic gate apparatus such as an RFID reader. The electric and/or magnetic field strength recorder may further comprise a communication unit performing two functions, namely receiving command data/command messages from the electromagnetic gate apparatus, but also being capable of sending reply data/reply messages to the electromagnetic gate apparatus. Thus, a unidirectionally communicating measurement unit (some kind of field data receiver) and a bi-directionally communicating communication unit (some kind of transceiver for exchanging control data with the electromagnetic gate application) may be combined. Information received from these two units may be supplied to an evaluation unit which may have the capability of assessing or analyzing the electromagnetic field properties of the electromagnetic gate apparatus, thereby allowing to derive information regarding a transponder read characteristic of the electromagnetic gate apparatus, in a spatially dependent manner. Particularly, weak points of the read characteristic may be evaluated, and information may be derived regarding a proper positioning of transponders within an operation range of the electromagnetic gate apparatus.

Thus, it may be possible to perform a field analysis particularly for any RFID application with a proper error analysis capability within an application. This may be used particularly for optimizing label positioning on a product. It may further serve for antenna characterization and antenna design. By providing an RF interface or any other wirelessly operating interface, disturbing influences by supply and signal cables during the measurement procedure may be securely prevented. By separating transmission channels for measurement and RF communication, it is possible to ensure that the RF data transfer has no influence on the measurements, and vice versa. A device according to an exemplary embodiment of the invention may be manufactured in a compact way with a high resolution and measurement range.

Next, further exemplary embodiments of the device will be explained. However, these embodiments also apply to the communication system and to the method.

The measurement device may be adapted for a unidirectional communication, and the communication unit may be adapted for a bi-directional communication. By restricting the communication capabilities of the measurement unit to a mere receiver function, undisturbed receipt of information can be guaranteed. This may be combined in an advantageous manner with a communication unit capable of both sending and receiving data, thereby allowing for a matched operation of device and gate application. Apart from receiving commands from the electromagnetic gate application and sending reply data to the electromagnetic gate application, it is also possible that the communication unit sends commands to the electromagnetic gate application and receives reply data from the electromagnetic gate application.

The measurement unit may comprise a measurement antenna for a wireless measurement of data. A loop antenna is an appropriate solution for such a measurement antenna.

The communication unit may comprise a communication antenna for a wireless exchange of data. A dipole antenna is an appropriate solution for such a communication antenna.

The communication unit and the measurement unit may be adapted for a communication at different frequencies or in different (for instance non-overlapping) frequency ranges. Thus, undesired crosstalk between two transmission channels, which could occur when using the same frequency or frequency band, may be securely prevented.

More particularly, the communication unit may be adapted for a communication at a first frequency, and the measurement unit may be adapted for a communication at a second frequency, wherein the first frequency may be lower than the second frequency. By selecting a larger frequency for the measurement antenna as compared to the frequency used by the communication antenna, an adjustment of the communication antenna to typical transponder frequencies may be combined with measurement antenna frequencies at which possible distortions (for instance by applying a transponder onto carriers having different materials) may be securely prevented. Therefore, complementary information may be received by the communication unit and by the measurement unit allowing to derive meaningful results.

The first frequency may be lower than about 1 GHz, particularly may be in a range between about 100 MHz and about 950 MHz. The first frequency may be adjusted to a dedicated transponder frequency such as an RFID frequency. For instance, the first frequency may be tuned to 433 MHz (amateur radio), 867 MHz (RFID, Europe), or 915 MHz (RFID, US).

The second frequency may be higher than about 1 GHz, particularly may be in a range between about 2 GHz and about 3 GHz. Thus, a sufficiently high operating frequency of the measurement antenna may be selected making the measurement results independent of the attachment of a transponder to different materials or products.

The device may comprise a power supply unit adapted for supplying the measurement unit, the communication unit and/or the evaluation unit with power, particularly with electric power for sending, receiving and evaluating the signals. Such a power supply unit may be integrated in the device, thereby providing an autarkic or self-sufficient device, which may be operated even in the absence of a mains supply.

The power supply unit may be adapted for being supplied, powered, loaded or recharged with energy from electromagnetic radiation of an electromagnetic gate apparatus. Since the device can usually be operated in an electromagnetic field of the electromagnetic gate apparatus to be characterized, the energy contained in this electromagnetic field may be used for powering the device. For that purpose, electric signals captured by the communication unit and the measurement unit may be used, for instance in combination with a rectifying circuit or the like, to recharge an accumulator of the power supply unit. Alternatively, a disposable battery may be used.

The communication unit may be adapted for sending, as the reply data, evaluated (measurement) data indicative of the electromagnetic field strength/field geometry to an electromagnetic gate apparatus. Thus, results of the evaluation may be sent back from the device to the electromagnetic gate apparatus, for instance for calibration purposes of the electromagnetic gate apparatus or to adjust a working point of the electromagnetic gate apparatus to improve the performance based on such a feedback. The communication unit may further be adapted for sending, as the reply data, a confirmation that a (previously received) command according to the command data has been executed. Upon receipt of a command message from the gate application, the communication unit may therefore send a reply indicating that the command has been worked off, for instance that a measurement has been started or stopped, or that requested measurement results have been broadcast. Such a reply message may also include the mere confirmation that a command message has been received properly, or could not be received properly.

The communication unit may be adapted for receiving, as the command data, a measurement start command (that is an instruction to start a measurement), a measurement stop command (that is an instruction to stop a measurement) or an evaluated data transmission request command (that is an instruction to transmit values of the field strength or the field geometry).

The measurement unit may comprise a memory adapted for storing the received values of the field strength. Such a memory, for instance an EEPROM or any other non-volatile memory, may be provided in the device for capturing or storing the data received during the operation. Therefore, this data can be later processed and evaluated.

A data interface may be provided at which evaluated data indicative of the electromagnetic field strength/field geometry of the electromagnetic gate apparatus may be providable. Such a data interface may allow communication in a wired or wireless manner with a peripheral device such as computer. By providing this data interface, the data capturing operation mode of the device may be performed independently of an apparatus for further processing the captured data, thereby allowing for a compact geometry.

The device may be configured as a stand-alone device. In other words, the device may be a portable device which may be used "in the field" without large sized periphery components, thereby providing an autarkic device which can operate without additional members. Therefore, it is possible to transport the device to the position at which an application is installed and perform the measurement at this position. If desired, it is possible to later further process the data after having established a communication connection between the device and an apparatus for further processing. This can be done at a location remote from the measurement, or at the same location.

The device may have an extension in each of three perpendicular directions in space (for instance x, y, and z axes of a Cartesian coordinate system) which extensions are each smaller than about 10 cm, particularly are smaller than about 5 cm, more particularly are smaller than or equal to about 3 cm. For example, the device may have a flat plate like arrangement with two dimensions in the order of magnitude of 3 cm and a third dimension below 1 cm. With such a small size, a proper simulation of a tag is guaranteed and a high spatial resolution of the electromagnetic field distribution may be obtained.

The communication between different components of the device or between the device and further devices may be carried out in a wired manner (for instance using a cable) or in a wireless manner (for instance via a WLAN, infrared communication or Bluetooth).

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
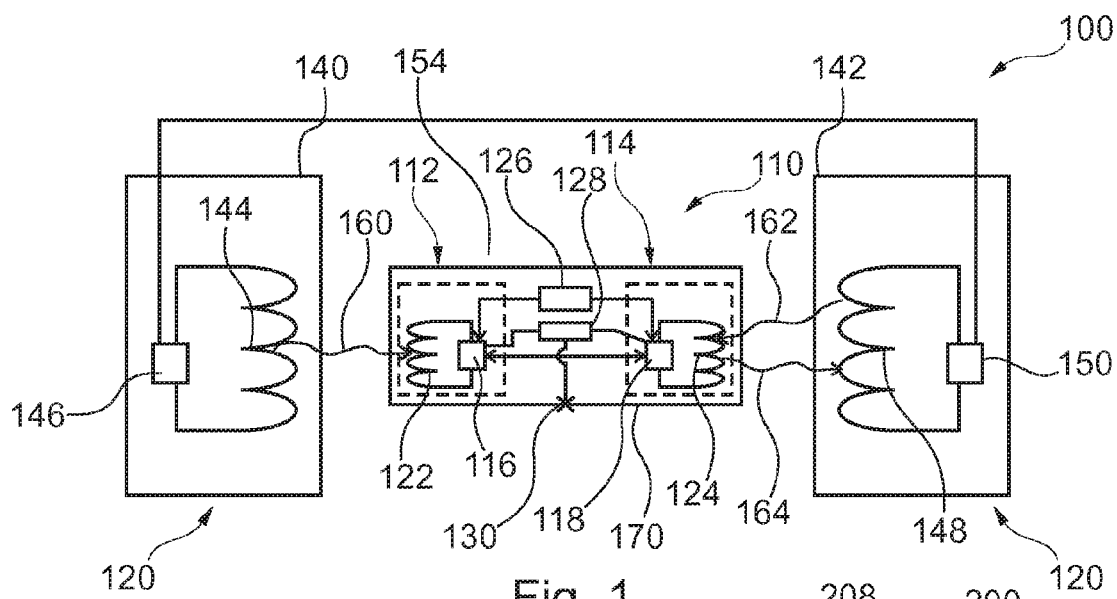
FIG. 1 and FIG. 3 show communication systems according to exemplary embodiments of the invention.

The illustration in the drawing is schematically. In different drawings, similar or identical elements are provided with the same reference signs.

FIG. 1 shows a communication system 100 according to an exemplary embodiment of the invention. The communication system 100 comprises an electromagnetic gate apparatus 120 such as a UHF gate application adapted for generating an electromagnetic field in an operation range between a first part 140 and a second part 142 of the electromagnetic gate apparatus 120. Furthermore, a device 110 for evaluating the electromagnetic field strength/field geometry of the electromagnetic gate apparatus 120 is provided.

The scheme of FIG. 1 is not to scale. The dimensions of the electromagnetic gate apparatus 120 (for example decimeters to meters) are usually much larger than the dimensions of the device 110 (for instance several centimeters). The device 110 may "simulate" a transponder tag and may serve to analyze a field distribution within or around the electromagnetic gate apparatus 120.

The first part 140 of the electromagnetic gate apparatus 120 comprises a first read/write coil 144, which is coupled to a first processor 146. Furthermore, the second part 142 comprises a second read/write coil 148 communicatively coupled to and controlled by a further control unit or processor 150. As can be taken from FIG. 1, the processors 146, 150 are coupled to one another to allow for a data exchange.

In response to a control signal of one of the processors 146, 150, the respective read/write coil 144, 148 may be provided with an electric signal to thereby generate an electromagnetic field in an active range 154 into which the device 110 is placed.

During normal use of the electromagnetic gate apparatus 120, it serves to read out information of RFID tags (not shown) if an RFID tag is present in the active range 154.

Placing the device 110 (instead of an RFID tag) in the active range 154, it is possible to derive information regarding the electromagnetic field characteristic in the active range 154, thereby allowing to analyze the function of the electromagnetic gate apparatus 120 for read/write purposes of a transponder (not shown, for instance an RFID tag or a contactless chip card).

The device 110 comprises a measurement unit 112 adapted for receiving a measurement signal from the electromagnetic gate apparatus 120 indicative of a characteristic of the electromagnetic field at the present position of the device 110, more precisely of the measurement unit 112. The measurement unit 112 may capture electromagnetic radiation 160 emitted by the read/write coil 144.

Furthermore, the device 110 comprises a communication unit 114 adapted for receiving command data from the electromagnetic gate apparatus 120 and adapted for sending communication data such as reply data to the electromagnetic gate apparatus 120. This is indicated schematically in FIG. 1 by means of electromagnetic radiation 162 emitted by the coil 148 and by means of electromagnetic radiation 164 emitted by a communication coil 124 of the communication unit 114 sent to and received by the coil 148 of the second part 142.

Moreover, evaluation units 116, 118 are provided for evaluating an electromagnetic field geometry of the electromagnetic gate apparatus 120 based on the values of the field strength received from a measurement coil 122. Messages 162, 164 exchanged between the communication coil 124 of the communication unit 114 and the electromagnetic gate apparatus 120 may serve to control and monitor the measurement.

Still referring to the evaluation units 116, 118, a first microprocessor 116 is communicatively coupled to the measurement coil 122 to evaluate the signals 160 received by the measurement coil 122. Moreover, an additional processor 118 is communicatively coupled to the communication coil 124 to thereby generate the data signals 164 to be sent to the electromagnetic gate apparatus 120. The additional processor 118 also evaluates the data 162 received from the electromagnetic gate apparatus 120. As can be taken from FIG. 1, the processors 116, 118 are communicatively coupled. Alternatively, it is also possible that the processors 116, 118 are combined to one single common processor. For example, the processors 116, 118 may adjust a mode of capturing electromagnetic radiation 160 in accordance with synchronization or control data exchanged as data messages 160, 162.

As can further be taken from FIG. 1, a memory 128 is provided which is communicatively coupled to both processors 116, 118 and which is capable of storing data to provide the latter via a wireless communication interface 130 to a communication partner device or directly to a user. The memory 128 is provided for storing the determined values of field strength or the field geometry, as raw data, or evaluated or pre-evaluated by the processors 116, 118.

The measurement unit 112 is adapted for a unidirectional communication only in a direction from the electromagnetic gate apparatus 120 to the device 110, whereas the communication unit 114 is adapted for a bi-directional communication with the electromagnetic gate apparatus 120, i.e. for a communication with the communication unit 114 serving as a source and the electromagnetic gate apparatus 120 serving as a destination of data, or in an operation mode in which the electromagnetic gate apparatus 120 serves as a source and the communication unit 114 serves as a destination of data.

The measurement antenna 122 is configured as a loop antenna. The communication antenna 124 is configured as a dipole antenna. The measurement antenna 122 operates at a frequency of 867 MHz, in the present embodiment. The communication antenna 124 operates at a frequency of 2.5 GHz, in the present embodiment.

A power supply unit 126 is provided which supplies both the measurement unit 112 and the communication unit 114 with electric power. The power supply unit 126 is adapted for being charged with energy from an electromagnetic field generated by the electromagnetic gate apparatus 120. When the electromagnetic gate apparatus 120 generates an electromagnetic field in the operation range 154 in which the device 110 is placed, the captured signals received by the antennas 122, 124 may be used (for instance in combination with a rectifier circuit or the like) as a source of electric power which can be used by the device 110 for powering components thereof.

As can be taken from FIG. 1, all components of the device 110 are arranged within a common housing 170 so that the device 110 is a stand-alone device, which can be operated without further periphery devices.

Before explaining further exemplary embodiments of the invention, some basic recognitions of the present inventors will be summarized based on which recognitions exemplary embodiments of the invention have been developed.

The evaluation of RFID field geometries within an application may be of relevance particularly in the ultra high frequency (UHF) domain.

Figure 2:
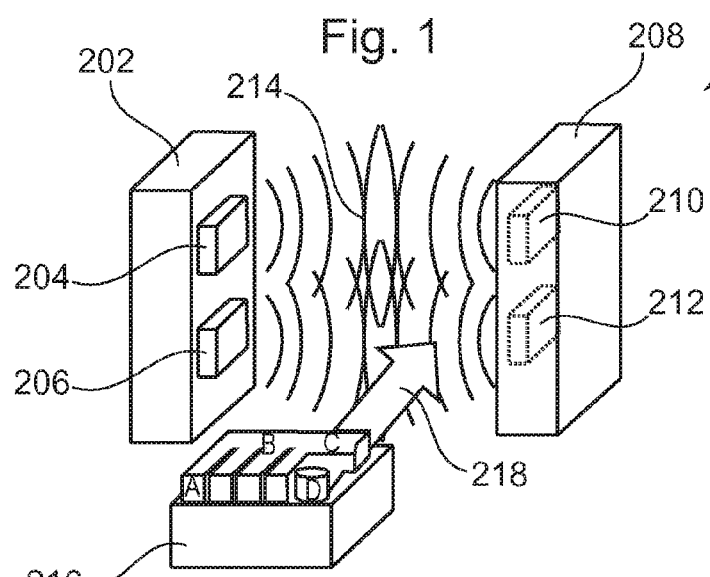
FIG. 2 illustrates a scenario in which a pallet with UHF labels is guided through an UHF gate application.

A system shown in FIG. 2 can serve to simulate a situation in a supermarket in which articles each provided with a tag are located in a shopping trolley, which is moved through an UHF gate application. It may then be desired that the UHF gate application identifies each of the articles (and corresponding information such as a price) so that the UHF gate application may then determine the total purchase price of all articles.

FIG. 2 shows an RFID gate application 200 having a first carrier 202 at which a first antenna 204 and a second antenna 206 are mounted and comprising a second carrier 208 on which a third antenna 210 and a fourth antenna 212 are mounted. In combination, the antennae 204, 206, 210, 210 generate a complex electromagnetic field distribution 214 in an active range of the UHF gate application 200.

FIG. 2 further shows a pallet 216 carrying UHF labels denoted with reference numerals A, B, C, D which can be inserted into the UHF application 200, as indicated by an arrow 218. In other words, the pallet 216 carrying the UHF labels A, B, C, D applied on different materials may be guided through the UHF gate application 200. The pallet 216 may be moved automatically by a robot, in particular by a so-called pallet movement system.

In such an RFID gate application 200, the read/write performance, reliability and quality achievable with all labels A, B, C, D arranged on the pallet 216 may strongly depend on the location of the respective label A, B, C, D in the operation range of the UHF gate application 200. In the presence of liquids, metals or other materials having a high density, such a read/write performance may be significantly reduced. A proper field analysis for the UHF gate application 200 can yield results or information which allow to optimize the read and/or write characteristic of an RFID gate application 200.

In order to analyze an ultra high frequency field, two methods may be used conventionally:

1. Implementation of measurement probes which are fixedly wired with a central computational unit 2. UHF tag emulators having implemented a standardized UHF protocol according to EPC Global, combined with a field strength sensor However, these conventional approaches have a number of drawbacks:

Regarding 1.: Such a system may lack sufficient flexibility due to the cables that need to be installed. Furthermore, disturbing influences on the received measurement values may occur due to the cables.

Referring to 2.: The communication and the measurement may be performed by a common dipole antenna. However, this may involve disturbing influences on the data to be measured. Moreover, the present measurements have to be interrupted for RF communication. Furthermore, such a system is difficult to implement (a complete EPC protocol, including anti-collision procedures for several devices, is required).

In order to eliminate or reduce these shortcomings, an exemplary embodiment of the invention provides a field strength recorder having two separate channels for communication and for measurement. This can be realized by two separate antennas, but also by two completely separated systems (a system may comprise an antenna plus a microcontroller plus a power supply).

Figure 3:
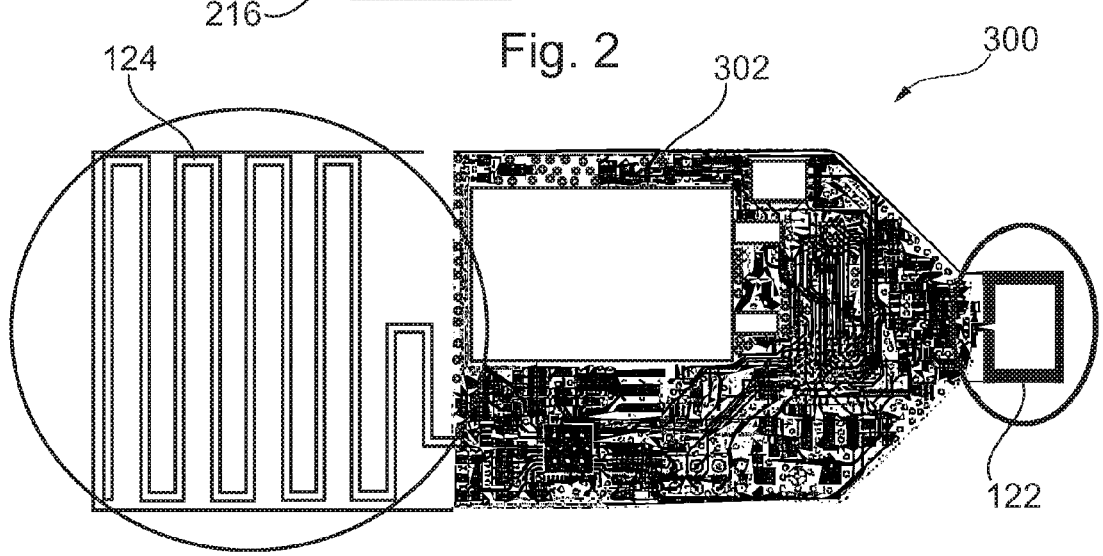

FIG. 3 shows a device 300 as an example for such a field strength recorder according to an exemplary embodiment of the invention. The device 300 has a dipole antenna 124 and a loop antenna 122. Furthermore, an electric circuit 302 is provided communicating with the antennae 122, 124.

The communication or dipole antenna 124 serves for the communication between a sender and the device 300, i.e. for the exchange of commands for bi-directional communication with a gate application. Via the antenna 124, RF commands may be received and sent. For instance, the dipole antenna 124 may receive the command message "start measurement", "stop measurement", "send measured data", and may send a response message upon receipt of a command to answer the command. When an analysis is finished, the stored values of field strength may be sent back to the sending station for further evaluation. The construction of the antenna 124 and the corresponding front end may be matched to an RFID frequency, for instance may be tuned to 433 MHz (amateur radio), 867 MHz (RFID, Europe), 915 MHz (RFID, USA), etc.

The measurement or loop antenna 122 may serve exclusively for capturing distortion-free values of field strength, which can be stored in an internal memory (RAM, flash, etc.). The measurement antenna 122 has a sufficiently high resonance frequency (for instance adjusted in a frequency range of 2 GHz to 3 GHz) in order to avoid distortion of measured values by tuning (for instance via the application of transponders on different materials).

The sender can be an experimental construction (for instance using a PC, a signal generator, an UHF antenna, etc.), but may also be a commercially available reader. When a reader is used, an EPC UHF protocol may be implemented in the device 300 for a wireless communication. It is also possible to communicate directly via a serial interface (USB, RS232, etc.) with the device 300. This may serve for both data communication and data exchange. Such a setup may be advantageous due to the standardized communication (including configuration of the device 300 via the reader) and the opportunity of a very precise evaluation of the radio frequency properties of the desired RFID application (for instance UHF gate, see FIG. 2), since all required measurement and analysis methods may be integrated in the reader and the device 300.

When using an experimental construction, a proprietary protocol or a simplified EPC protocol may be used which reduces the implantation expenditure of the device 300.

The transfer of the values of field strength to a personal computer can be performed via an RF interface but also via another interface (USB, LAN, serial, etc.). Subsequently, the evaluation may be performed at the personal computer.

Therefore, according to an exemplary embodiment, a stand-alone device (power supply on board) may be provided. Recharging batteries may be performed during the communication by coupled electromagnetic energy. Separated channels for measurement and communication within the application may be provided. Providing separate antennae may perform the separation. The separation may be performed as well by separate electronic systems. The protocol for the RF communication between the sending station (or reader) and the device 300 is freely selectable.

It is also possible that multiple devices for evaluating an electromagnetic field strength/field geometry of an electromagnetic gate apparatus are simultaneously employed with one electromagnetic gate apparatus so as to simulate a realistic scenario in which multiple tags are present at the same time within an operating range of a gate application.

It should be noted that the term "comprising" does not exclude other elements or features and the "a" or "an" does not exclude a plurality. Also elements described in association with different embodiments may be combined.

It should also be noted that reference signs in the claims should not be construed as limiting the scope of the claims.

The invention claimed is:

1. A device for determining a field strength of an electromagnetic gate apparatus, the device comprising
    a measurement unit adapted for receiving a measurement signal from the electromagnetic gate apparatus and determining a value of the field strength of said measurement signal;
    a communication unit adapted for receiving command data from the electromagnetic gate apparatus and adapted for sending response data to the electromagnetic gate apparatus; and an evaluation unit adapted for evaluating the electromagnetic field geometry of the electromagnetic gate apparatus based on said values of the field strength.

2. The device according to claim 1, wherein the measurement unit comprises a memory adapted for storing values of the field strength.

3. The device according to claim 1, wherein the measurement unit is adapted for a unidirectional communication with the electromagnetic gate apparatus and the communication unit is adapted for a bi-directional communication with the electromagnetic gate apparatus.

4. The device according to claim 1, wherein the measurement unit comprises a measurement antenna and/or the communication unit comprises a communication antenna.

5. The device according to claim 1, wherein the communication unit and the measurement unit are adapted for a communication with the electromagnetic gate apparatus via different communication channels.

6. The device according to claim 1, wherein the communication unit is adapted for a communication with the electromagnetic gate apparatus at a first frequency and the measurement unit is adapted for a communication with the electromagnetic gate apparatus at a second frequency, wherein the first frequency is lower than the second frequency.

7. The device according to claim 6, wherein the first frequency is lower than 1 GHz and/or the second frequency is higher than 1 GHz.

8. The device according to claim 1, comprising a power supply unit adapted for supplying at least one of the group consisting of the measurement unit, the communication unit and the evaluation unit with power from electromagnetic radiation of the electromagnetic gate apparatus.

9. A communication system comprising an electromagnetic gate apparatus adapted for generating an electromagnetic field having an electromagnetic field geometry, and a device as claimed in claim 1.

10. A method of determining the field strength of an electromagnetic gate apparatus, the method comprising the steps of
a measurement unit receiving a measurement signal from the electromagnetic gate apparatus and determining a value of the field strength of said measurement signal; and
a communication unit receiving command data from the electromagnetic gate apparatus and sending response data to the electromagnetic gate apparatus.

* * * * *